United States Patent
Feldman

(10) Patent No.: US 9,754,275 B2
(45) Date of Patent: *Sep. 5, 2017

(54) SYSTEM AND METHOD FOR CARD-LINKED SERVICES

(71) Applicant: MasterCard International Incorporated, Purchase, NY (US)

(72) Inventor: Jason A Feldman, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/071,018

(22) Filed: Nov. 4, 2013

(65) Prior Publication Data
US 2015/0127441 A1    May 7, 2015

(51) Int. Cl.
*G06Q 30/00* (2012.01)
*G06Q 30/02* (2012.01)
(Continued)

(52) U.S. Cl.
CPC ........ *G06Q 30/0215* (2013.01); *G06F 3/011* (2013.01); *G06Q 30/0269* (2013.01);
(Continued)

(58) Field of Classification Search
CPC .... G06Q 30/02; G06Q 30/236; G06Q 30/207; G06Q 20/387
(Continued)

(56) References Cited

U.S. PATENT DOCUMENTS

| 5,717,866 A | 2/1998 | Naftzger |
| 5,924,078 A | 7/1999 | Naftzger |

(Continued)

FOREIGN PATENT DOCUMENTS

WO    WO2007092789 A2    8/2007

OTHER PUBLICATIONS

PCT/US2008/080427 Preliminary Report on Patentability mailed Jul. 8, 2010, 9 pages.
(Continued)

*Primary Examiner* — Luis A Brown
*Assistant Examiner* — Radu Andrei
(74) *Attorney, Agent, or Firm* — Leason Ellis LLP

(57) ABSTRACT

A system and method are disclosed for applying a rebate or promotion associated with a transaction account. Offer information representing an offer for a promotion or rebate provided to a purchaser is received, and at least some of the offer information is processed to associate the purchaser with at least one transaction account. Account information representing the at least one transaction account associated with the purchaser is transmitted to a computing device associated with the first party. Transaction information representing a transaction associated with the offer information and the account information is received from a computing device associated with the first party or a second party, and is processed to associate the transaction with the transaction account associated with the purchaser and the promotion or rebate. The rebate or promotion is applied as a function of the transaction information.

29 Claims, 15 Drawing Sheets

(51) Int. Cl.
*H04N 21/414* (2011.01)
*G06T 3/00* (2006.01)
*G06F 3/01* (2006.01)
*G06T 1/00* (2006.01)

(52) U.S. Cl.
CPC .......... *G06T 1/0021* (2013.01); *G06T 3/0006* (2013.01); *H04N 21/41415* (2013.01)

(58) Field of Classification Search
USPC .......... 705/14.1, 14.24, 14.25, 14.58, 14.49; 713/176; 382/100, 106
See application file for complete search history.

(56) References Cited

U.S. PATENT DOCUMENTS

| | | | |
|---|---|---|---|
| 6,049,778 | A | 4/2000 | Walker et al. |
| 6,594,640 | B1 | 7/2003 | Postrel |
| 6,671,358 | B1 | 12/2003 | Seidman et al. |
| 7,103,573 | B2 | 9/2006 | Mobed et al. |
| 7,308,254 | B1 | 12/2007 | Rissanen |
| 7,392,224 | B1 | 6/2008 | Bauer et al. |
| 7,665,660 | B2 | 2/2010 | Degliantoni et al. |
| 7,844,490 | B2 | 11/2010 | Patterson |
| 7,857,210 | B2 | 12/2010 | Tietzen et al. |
| 7,908,170 | B2 | 3/2011 | Asmar et al. |
| 7,934,639 | B1 | 5/2011 | Chen et al. |
| 7,949,559 | B2 | 5/2011 | Freiberg |
| 7,958,052 | B2 | 6/2011 | Powell |
| 8,214,293 | B2 | 7/2012 | Powell |
| 8,355,988 | B2 | 1/2013 | Powell |
| 8,768,764 | B1* | 7/2014 | Paharia ............. G06Q 30/0269 705/14.1 |
| 2002/0062249 | A1* | 5/2002 | Iannacci ............. G06Q 20/10 705/14.1 |
| 2002/0133400 | A1 | 9/2002 | Terry et al. |
| 2004/0122736 | A1 | 6/2004 | Strock et al. |
| 2005/0197904 | A1 | 9/2005 | Baron et al. |
| 2005/0267812 | A1 | 12/2005 | Jensen et al. |
| 2006/0011719 | A1 | 1/2006 | Lehtonen et al. |
| 2006/0259364 | A1 | 11/2006 | Strock et al. |
| 2007/0038515 | A1 | 2/2007 | Postrel |
| 2007/0088603 | A1* | 4/2007 | Jouppi ................ G06Q 30/02 705/14.66 |
| 2007/0150411 | A1 | 6/2007 | Addepalli et al. |
| 2007/0255620 | A1* | 11/2007 | Tumminaro ......... G06Q 20/10 705/14.27 |
| 2007/0267479 | A1 | 11/2007 | Nix et al. |
| 2008/0005018 | A1 | 1/2008 | Powell |
| 2008/0133339 | A1 | 6/2008 | Drakoulis et al. |
| 2008/0133350 | A1 | 6/2008 | White et al. |
| 2009/0171777 | A1 | 7/2009 | Powell |
| 2009/0171778 | A1 | 7/2009 | Powell |
| 2010/0057553 | A1 | 3/2010 | Ameiss et al. |
| 2010/0312620 | A1 | 12/2010 | White et al. |
| 2011/0047072 | A1* | 2/2011 | Ciurea ................ G06Q 20/10 705/39 |
| 2011/0106607 | A1 | 5/2011 | Alfonso et al. |
| 2011/0231233 | A1 | 9/2011 | Iannace et al. |
| 2011/0251882 | A1* | 10/2011 | Richard ............... G06Q 30/02 705/14.25 |
| 2012/0004973 | A1* | 1/2012 | Postrel ............... G06Q 20/387 705/14.27 |
| 2012/0035997 | A1 | 2/2012 | Burgess et al. |
| 2012/0136704 | A1* | 5/2012 | Carlson ............... G06Q 30/02 705/14.17 |
| 2012/0271705 | A1* | 10/2012 | Postrel ............... G06Q 30/02 705/14.33 |
| 2012/0284127 | A1* | 11/2012 | Heiser, II ........ G06F 17/30867 705/14.66 |
| 2013/0151388 | A1* | 6/2013 | Falkenborg ......... G06Q 40/02 705/35 |
| 2013/0191213 | A1* | 7/2013 | Beck .................. G06Q 30/0267 705/14.53 |
| 2014/0012669 | A1* | 1/2014 | Heiser, II ........ G06F 17/30867 705/14.53 |
| 2014/0310159 | A1* | 10/2014 | Zoldi ................. G06Q 20/4016 705/39 |

OTHER PUBLICATIONS

PCT/US2008/080427 International Search Report mailed Dec. 10, 2008, 3 pages.
PCT/US2008/080427 Written Opinion of International Searching Authority mailed Dec. 10, 2008, 9 pages.
U.S. Appl. No. 11/966,724 Office Action mailed Nov. 12, 2010, 26 pages.
U.S. Appl. No. 11/966,803 Office Action mailed Nov. 17, 2010, 30 pages.
PCT/US2008/080482 Preliminary Report on Patentability mailed Jul. 8, 2010, 12 pages.
PCT/US2008/080482 International Search Report and Written Opinion of the International Searching Authority mailed Jan. 7, 2009, 13 pages.

* cited by examiner

SYSTEM AND METHOD FOR CARD-LINKED SERVICES

FIELD

The present application relates generally to communications, and more particularly, to a system and method for providing card-linked advertisement offers.

BACKGROUND

Large online networks, such as relating to search engines, social network sites, e-commerce sites, news and entertainment providers, or the like, often collect registration data and browsing behavior data on their user populations. During the a registration process, for example, users often provide personally identifiable information such as name, e-mail address, gender, physical address information, or the like. In cases of mobile software applications, providers often access names and phone numbers of users' contacts, other applications that are installed on a mobile device, telephone number, device ID. Using this information, providers can imply a number of metrics. By capturing user data points, providers can infer new information from analyzing the attributes of the aggregated population. For instance, an implied metric may be a user's address. Using GPS information from a user's phone, a social network site and others can monitor the latitude/longitude of the device at night. A mobile software application may provide access to a user's e-mail address and phone number, and inferred metrics can include other information, such as the type of device, operating system, or the like. GPS information may be provided if a user opts in, and can include information such as a user's zip code or the like. Moreover, these opted-in records can be sold and used for a variety of purposes including online behavioral advertising. For example, a news-related site associated with a company that provides home delivery has access to address information for its customers. Further to this example, an inferred data point would be that that a customer owns a tablet device because that customer accesses the news-related site from a mobile browser. In some cases, these sites have an e-commerce platform and also receive payment card numbers.

In addition to data collection, such records can be matched against databases at consumer research companies, credit bureaus, or one another to create detailed consumer profiles.

It is with respect to these and other considerations that the present application is presented.

SUMMARY

A system and method are disclosed for applying a rebate or promotion associated with a transaction account. Offer information representing an offer for a promotion or rebate provided to a purchaser is received, and at least some of the offer information is processed to associate the purchaser with at least one transaction account. Account information representing the at least one transaction account associated with the purchaser is transmitted to a computing device associated with the first party. Transaction information representing a transaction associated with the offer information and the account information is received from a computing device associated with the first party or a second party, and is processed to associate the transaction with the transaction account associated with the purchaser and the promotion or rebate. The rebate or promotion is applied as a function of the transaction information.

In one or more implementations, the offer information is received and maintained for access prior to receiving the transaction information, or determined substantially in real-time as a function of an offer received by the user. The offer information can be determined based on one or more of an identification of the offer, a number of offers redeemed by the user, and a value of the user to a merchant.

These and other aspects, features, and advantages of the disclosure can be understood with reference to the following detailed description of certain embodiments of the disclosure taken together in conjunction with the accompanying drawing figures.

DESCRIPTION

Figure 1:
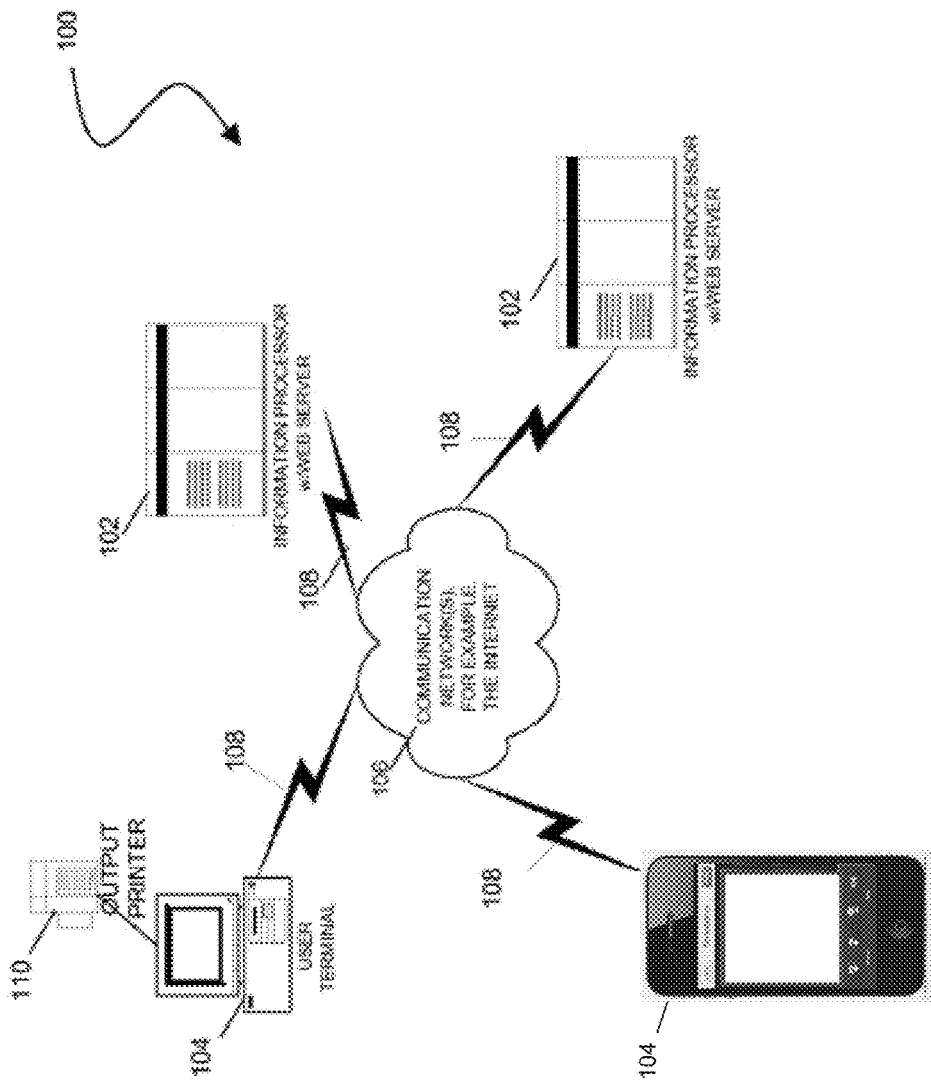
FIG. 1 is a diagram of an example hardware arrangement that operates for providing the systems and methods disclosed herein.

The present application provides redeemable offers that are applied to a transaction account, for example, that is associated with a payment card (e.g., a debit card, credit card or other type of card). This is unlike known systems in which promotions, coupons or the like are often sent to users via e-mail or postal mail and thereafter redeemed.

In one or more implementations, the present application provides an architecture and process for the assignment of a promotion and/or offer to be associated with a transaction account, such as associated with a credit card, bank debit card or the like, within an on-line network in which users register. For example, a user registers with a web site using first name, last name, e-mail address, physical mailing address, and phone number. As used herein, an on-line network refers, generally, to an Internet-based resource in which users register. Examples may include social network web sites, e-commerce web sites, news and entertainment web sites, and mobile applications. Once registered, the user has access to one or more features that are provided by the site, and the site has access to personally identifiable information and metadata associated with the user.

In one or more implementations, the present application provides a promotion associated with an on-line user's transaction account. In such implementation(s), target user information associated with at least one user targeted to receive an advertisement is identified. Target user information may include, for example, the user's past purchasing behavior, the user's propensity for future purchasing, a particular age group, visitors to a particular Internet web site, or one or more persons accessing a particular mobile software application. Target users may include those who are slated to see the advertisement for satisfying criteria that have been established by an advertiser for showing advertisements. A visitor to a webpage, for example, may be within some definition of a target-user in accordance with an advertiser's campaign. In accordance with the target individual user information and the advertisement, a probability of the person(s) to accept the promotion may be determined. Thereafter and as a function of the determined probability, promotion information associated with the promotion is selected. For example, promotional information associated with a particular brand of handbag may be selected in view of a determination that the viewer is a female under 25 years old and has a 55% probability of being receptive to a promotion associated with the handbag. In this example, the respective advertising criteria may include women between 20-40 years old who purchase in the category more than once a year. The promotion information is transmitted to a computing device associated with the person(s). In response to the transmitted promotion information, an acceptance of the promotion is received from the computing device and the promotion information is processed to associate the promotion with the transaction account.

In one or more implementations, the present application provides a promotion associated with a transaction account, in which advertising targeting criteria is submitted to a computing device associated with a data management platform. The advertising targeting criteria is usable to target at least one individual purchaser to receive a respective advertisement for the promotion. For example, the targeting information may represent one or more of a particular age group, gender, income level, geography, web site usage, and purchase history, among other demographic characteristics. Web site usage may include one or more of a plurality of characteristics. For example, a web site usage may include one or more of a history of internet web sites visited by the person(s), a length of time the person(s) visited an internet web site, the number of times the person(s) visited an internet web site, one or more products or services offered for sale on an internet web site visited by the person(s), a number of selections in an internet web site made by the at least person, and a length of time since the person(s) visited an internet web site. This may include or in addition, the number of times that an individual purchaser had previously seen an offer or promotion associated with a specific campaign. In such implementation(s), viewer information that is associated with individual purchaser(s) targeted to receive the respective advertisement is received and processed.

Referring now to the drawings figures in which like reference numerals refer to like elements, there is shown in FIG. 1 a diagram of an example hardware arrangement that operates for providing the systems and methods disclosed herein, and designated generally as system 100. System 100 is preferably comprised of one or more information processors 102 coupled to one or more user workstations 104 across communication network 106.

Continuing with reference to FIG. 1, user workstations may include, for example, mobile computing devices such as tablet computing devices, smartphones, personal digital assistants or the like. Further, printed output is provided, for example, via output printers 110.

Information processor 102 preferably includes all necessary databases for the present disclosure, including image files, metadata and other information. However, it is contemplated that information processor 102 can access any required databases via communication network 106 or any other communication network to which information processor 102 has access. Information processor 102 can communicate devices comprising databases using any known communication method, including a direct serial, parallel, USB interface, or via a local or wide area network.

User workstations 104 communicate with information processors 102 using data connections 108, which are respectively coupled to communication network 106. Communication network 106 can be any communication network, but is typically the Internet or some other global computer network. Data connections 108 can be any known arrangement for accessing communication network 106, such as dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User workstations 104 preferably have the ability to send and receive data across communication network 106, and are equipped with web browsers to display the received data on display devices incorporated therewith. By way of example, user workstation 104 may be personal computers, but are not limited to such computers. Other workstations that can communicate over a global computer network such as palmtop computers, personal digital assistants (PDAs) and mass-marketed Internet access devices such as WebTV can be used. In addition, the hardware arrangement of the present disclosure is not limited to devices that are physically wired to communication network 106. Of course, one skilled in the art will recognize that wireless devices can communicate with information processors 102 using wireless data communication connections (e.g., WIFI).

According to an embodiment of the present application, user workstation 104 provides user access to information processor 102. The specific functionality provided by system 100, and in particular information processors 102, is described in detail below.

System 100 preferably includes software that provides functionality described in greater detail herein, and preferably resides on one or more information processors 102 and/or user workstations 104. One of the functions performed by information processor 102 is that of operating as a web server and/or a web site host. Information processors 102 typically communicate with communication network 106 across a permanent i.e., unswitched data connection 108. Permanent connectivity ensures that access to information processors 102 is always available.

Figure 2:
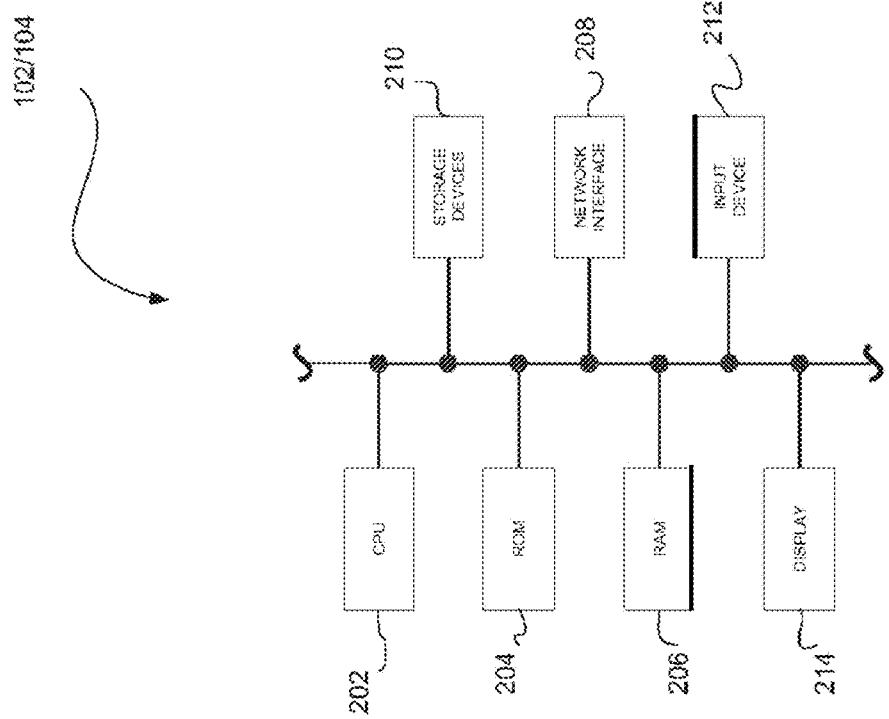
FIG. 2 illustrates functional elements of an information processor or workstation.

As shown in FIG. 2 the functional elements of each information processor 102 or workstation 104, and preferably include one or more central processing units (CPU) 202 used to execute software code in order to control the operation of information processor 102, read only memory (ROM) 204, random access memory (RAM) 206, one or more network interfaces 208 to transmit and receive data to and from other computing devices across a communication network, storage devices 210 such as a hard disk drive, floppy disk drive, tape drive, CD-ROM or DVD drive for storing program code, databases and application code, one or more input devices 212 such as a keyboard, mouse, track ball and the like, and a display 214.

The various components of information processor 102 need not be physically contained within the same chassis or even located in a single location. For example, as explained above with respect to databases that can reside on storage device 210, storage device 210 may be located at a site which is remote from the remaining elements of information processors 102, and may even be connected to CPU 202 across communication network 106 via network interface 208.

The functional elements shown in FIG. 2 (designated by reference numbers 202-214) are preferably the same categories of functional elements preferably present in user workstation 104. However, not all elements need be present, for example, storage devices in the case of PDAs, and the capacities of the various elements are arranged to accommodate expected user demand. For example, CPU 202 in user workstation 104 may be of a smaller capacity than CPU 202 as present in information processor 102. Similarly, it is likely that information processor 102 will include storage devices 210 of a much higher capacity than storage devices 210 present in workstation 104. Of course, one of ordinary skill in the art will understand that the capacities of the functional elements can be adjusted as needed.

The nature of the present application is such that one skilled in the art of writing computer executed code (software) can implement the described functions using one or more or a combination of a popular computer programming language, including, but not limited to, C++, VISUAL BASIC, JAVA, ACTIVEX, HTML, XML, ASP, SOAP, IOS, ANDROID, TORR, Ruby, Python, Ruby on Rails, SAAS and PHP and various web application development environments.

As used herein, references to displaying data on user workstation 104 refer to the process of communicating data to the workstation across communication network 106 and processing the data such that the data can be viewed on the user workstation 104 display 214 using a web browser or the like. The display screens on user workstation 104 present areas within system 100 such that a user can proceed from area to area within the system 100 by selecting a desired link. Therefore, each user's experience with system 100 will be based on the order with which (s)he progresses through the display screens. In other words, because the system is not completely hierarchical in its arrangement of display screens, users can proceed from area to area without the need to "backtrack" through a series of display screens. For that reason and unless stated otherwise, the following discussion of the components of system 100 is not intended to represent any sequential operation steps.

Although the present application is described by way of example herein in terms of a web-based system using web browsers and a web site server (information processor 102), and with mobile computing devices (104), system 100 is not limited to that particular configuration. It is contemplated that system 100 can be arranged such that user workstation 104 can communicate with, and display data received from, information processor 102 using any known communication and display method, for example, using a non-Internet browser Windows viewer coupled with a local area network protocol such as the Internetwork Packet Exchange (IPX). It is further contemplated that any suitable operating system can be used on user workstation 104, including any suitable PDA or palm computer operating system, if applicable.

As shown and described herein, the present application provides redeemable offers that are applied to a transaction account, for example, that is associated with a payment card (e.g., a debit card, credit card or other card). This precludes a requirement of additional registration by the user, including the submission of personally identifiable information that may be otherwise required of the purchaser.

Figure 3:
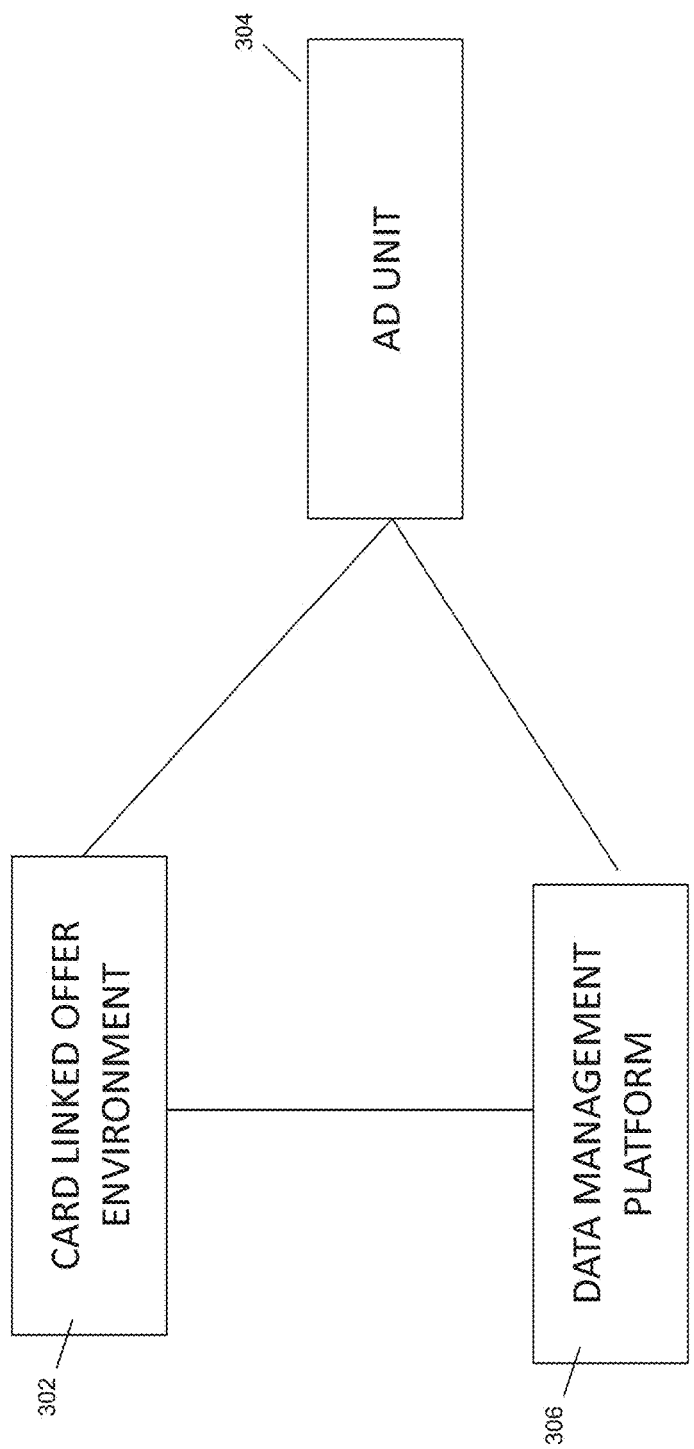
FIG. 3 is a block diagram representing three example implementations in accordance with the present application.

With reference now to the block diagram shown in FIG. 3, as noted herein the present application provides an architecture and process 302 for the assignment of a promotion and/or offer to be associated with a transaction account, such as associated with a credit card, bank debit card or the like, within an on-line network in which users register. In one or more other implementations, the present application provides a promotional advertising unit 304 associated with an individual purchaser's transaction account. Moreover, in one or more implementations, the present application provides a promotion associated with a transaction account, in which advertising targeting criteria is submitted to a computing device associated with a data management platform 306. Attributes in a data management platform may be assigned and stored to individual user cookies. A 'bidding exchange' can include an environment where advertisers participate in an auction to show their promotion to a user with relevant target characteristics. Details associated with each of the respective implementations are described in greater detail, herein.

In accordance with one or more implementations of the present application, various forms of offers, such as coupons, promotions or other offers may be provided without a need for a user to register or otherwise submit personally identifiable information and/or financial information in order to redeem the offer. In one or more implementations, a payment card (or other account identifier) number is substantially automatically associated with other information, such as personal identifiable information or non-identifiable attributes, from a plurality of disparate data sources. An entity such as a credit bureau, a consumer data collection firm, a database marketing company, a loyalty card provider, an issuing bank or the like may have information representing people's payment card numbers, as well as other personally identifiable information of the people, such as full name, birth date, e-mail address, education, school attended, home value, mortgage value, presence of children or the like. A proprietor of the present application may provide some form of personally identifiable information received from an on-line network, such as an e-mail address or user name, to the entity that has access to such personally identifiable information and transaction account information. Thereafter, a match may be made of the personally identifiable information with one or more transaction accounts held by a person, and information representing a respective person's accounts may be provided thereby. In this way, an entity having access to information to identify an individual, but with no access to financial information associated with the individual may now offer promotions, discounts or other financial benefits with out requiring intrusive requests of the individual, as a function of the present application. Alternatively, personally identifiable information may not be transmitted. Instead, for example, unique user identifiers can get passed back and forth to ensure compliance with one or more privacy concerns, laws and/or policies.

In one or more implementations, an assignment of a promotion/offer is received, which is to be provided to an on-line user (e.g., an individual purchaser using standard web browser software accessing an Internet web page, or a person using a mobile application and accessing an Internet-based resource). For example, a user selecting a search, display, video, or other resource that may be capable of providing a coupon, promotion or other offer may be applied to a payment card, without requiring additional input or action from the user. The result is a new advertisement unit type enabling a user to assign an offer to a transaction account associated with a payment card. The offer is redeemable straight to a card, without requiring any other information, such as registration information, from the consumer. In one or more embodiments, users do not need to print anything, and do not need to present a barcode on an application, or other such steps. Instead, a user simply pays and the point of sale system applies the discount. The discount can get applied immediately at purchase, or be applied as a statement credit at the end of the billing cycle.

In accordance with one or more implementations, a coupon, promotion or other offer is processed to associate the offer with a transaction account. Such offer may be pre-determined or, alternatively, rules may be configured and/or applied to determine in real-time. The offer may be offered as a function of various conditions, such as the number of offers that have been redeemed generally or by a respective user, the value of the respective user to a merchant or other factor. Other conditions may include historical purchase behavior, for example, which are usable to preclude sending offers for a product or brand that a customer would not want.

FIGS. 4-7 are flowcharts illustrating example steps associated with implementations of the present application. In accordance with one or more implementations, including as set forth in the steps associated with FIGS. 4-7, a promotion can be associated with a respective account, and that the association of the promotion with the account does not require that the account has transacted for a good/service. The present application supports that the account is able to redeem a promotion should the account holder choose to transact.

Figure 4:
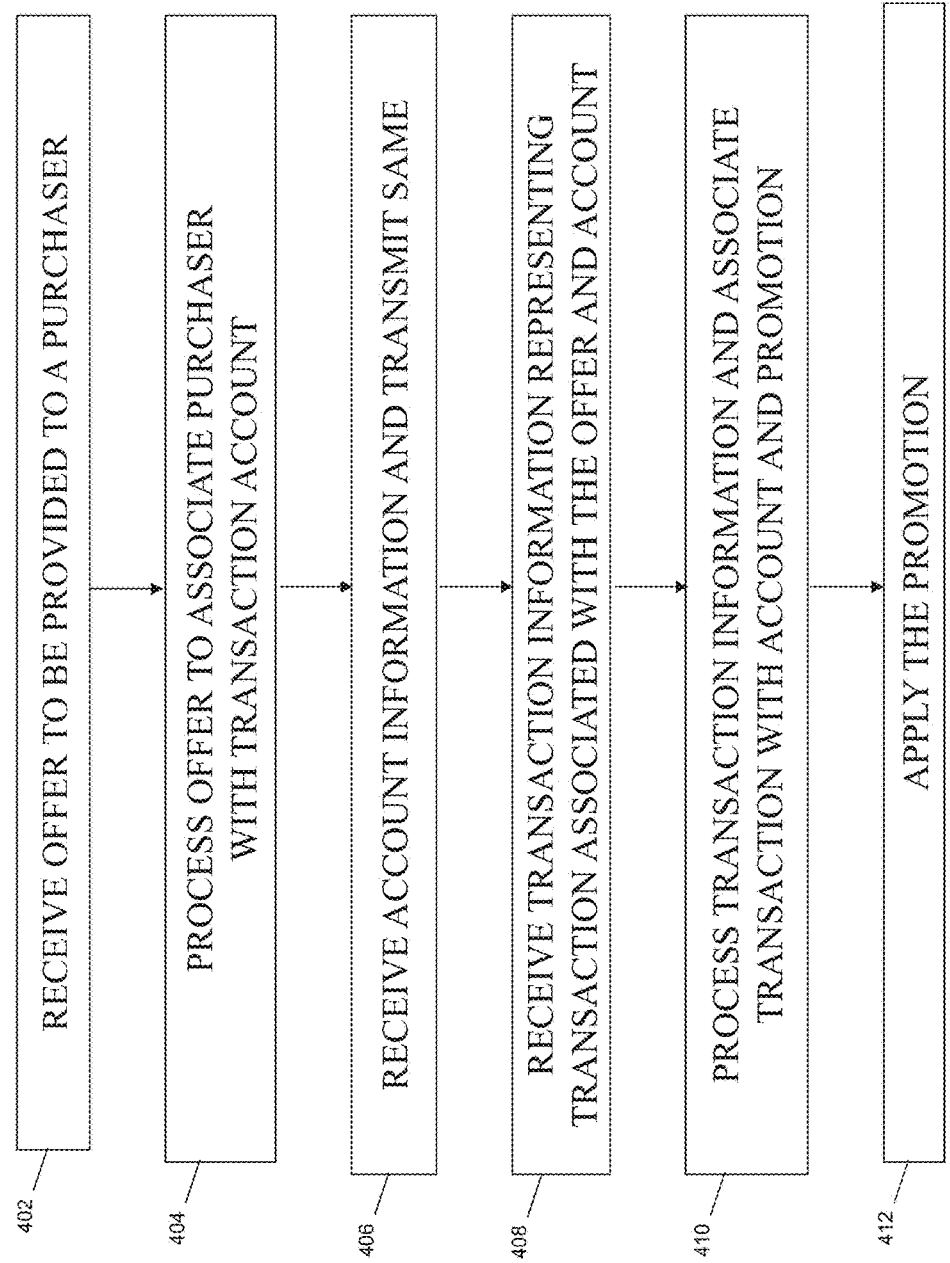
FIGS. 4-6 are flowcharts that illustrate example steps associated with implementations of the present application.

With reference now to FIG. 4, in one or more implementations, an offer associated with a promotion or rebate is received from a first party, such as a merchant offering goods or services for sale (step 402). For example, an electronic coupon offered to an individual purchaser for a 20% discount is received from a merchant that sells purses and handbags. As used herein, the term, "individual purchaser," refers generally to any person who may be deemed to purchase a good or service at some time. A "targeted individual purchaser," may refer to a specific individual purchaser who is targeted to receive an advertisement due to the person meeting certain criteria, such as men, between the ages of 24-35 and who buy rock concert tickets. The offer may be processed to associate the purchaser with one or more accounts, such as in connection with a credit card, debit card or other suitable card. In one or more implementations, this may occur by transmitting information representing the individual purchaser to a card-link offer company (step 404). As used herein, a card-link offer company refers, generally, to an entity that has access to information representing one or more accounts of individual purchasers. In one-or more implementations, a card-linked offer company is able to instruct a merchant's point of sale (POS) system which cards to apply an offer, and the respective terms of an offer. The card-linked offer company passes, substantially in real time, the transaction accounts that had interacted with a card-linked offer advertising unit and that subsequently had opted to associate an offer with one or more respective accounts. An example of such an entity may be, for example, a credit bureau. Thereafter, information may be received from the card-link offer company that represents the individual purchaser and one or more of the purchaser's accounts. For example, the individual purchaser who received the advertisement for the 20% discount selects the advertisement and information representing the purchaser is transmitted to a card-link offer company. Thereafter, information is received from the card-link offer company that represents the purchaser and three of the purchaser's respective payment card numbers. The numbers may be formatted such that only a portion of the number is visible. The purchaser is prompted to select one of the three accounts for applying the offer.

After the user selects one of the accounts, information representing the selected account may be received and thereafter, a combination of the offer and the selected account is transmitted to the card-link offer company (step 406). Thereafter, when the purchaser purchases the item (in the present example, a handbag), the 20% discount is applied directly to the account associated with the received card. This may occur by receiving transaction information representing a transaction associated with the offer information and the account information (step 408). The transaction information is processed to associate the transaction with the transaction account associated with the purchaser and the promotion or rebate (step 410). Continuing with the present example, this enables the 20% discount to be applied (step 412).

In one or more alternative implementations, various personally identifiable information associated with purchasers may be obtained, including by purchase, which may be stored for future reference. For example, demographic information and personally identifiable information may be purchased from one or more card-linked offer companies and matched with other information representing individual purchasers and a unique index value (e.g., a "key") may be generated that represents the match. This information may be purchased from a credit bureau/consumer research firm.

Moreover, offer information that is received from one or more merchants may be stored for access prior to receiving transaction information. For example, after an individual purchaser selects an offer and, thereafter, purchases an item associated with the offer, information associated with the offer may be accessed and used to apply the offer to the purchase. Such offers may be pre-determined or rules may be configured to determine, substantially in real-time, which offer a respective individual purchaser user is to receive. One or more variables, such as the number of redeemed offers or the relative value of an individual purchaser to a respective merchant, may be used in the determination of which particular offer an individual purchaser should receive.

In accordance with one or more implementations, the individual purchaser's transaction account is securely and operatively coupled to a trusted service manager or a transaction card. The transaction card may be, for example, a credit card, a debit card, a rewards card, a gift card, a hotel room key and/or a membership card. In one or more implementations, the card has a name, address, or some other type of personally identifiable information associated with it that the card-linked offer company can use for matching. In one or more implementations, the card may be a gift card that has other information, such as relating to a credit card or debit card that was used to purchase the gift card, and/or the name/e-mail address of the intended recipient associated therewith. The transaction card may further be associated with a database that includes one or more characteristic and/or registration information that is usable to be matched to the first user.

In one or more implementations, various processing steps may be associated with the offer information. At least some of the offer information may be transmitted to a computing device associated with an on-line network and, thereafter, purchaser identification information representing at least an identification associated with the individual purchaser may be received. For example, the on-line network may include a social network, an e-mail network, or login that persists across various sites. An example of such persistence occurs when information received in FACEBOOK® is passed to any site that has a "LIKE" button or FACEBOOK content. Alternatively, the on-line network may include any Internet web site in which users register to access services provided by the web site. For example, the on-line network may be a provider of news content, entertainment media, e-mail or other content. The purchaser identification information may then be associated with the at least one transaction account. As noted herein, the individual purchaser identification information may include various kinds of information associated with the purchaser such as, for example, name, e-mail address, zip code, address, gender, telephone number, income, education, debt, family member(s), census tract, and demographics.

Furthermore, processing at least some of the offer information may include accessing one or more databases that store information associated with individual purchasers and transaction accounts. Thereafter, at least some of the information included in the database may be selected that corresponds with at least the individual purchaser. Moreover, the transaction account(s) may be at least two transaction accounts. In such case, a selection of one of the transaction accounts, and the rebate or promotion may be applied to the selected one transaction account. The rebate may be applied (i) at the time of transaction, or (ii) as a statement credit at the end of the billing cycle. Information associated with the account may be formatted to include information associated with the promotion or rebate and the transaction account. The transaction account information may include, for example, a credit card number and expiration date, and information associated with the individual purchaser.

Figure 5:
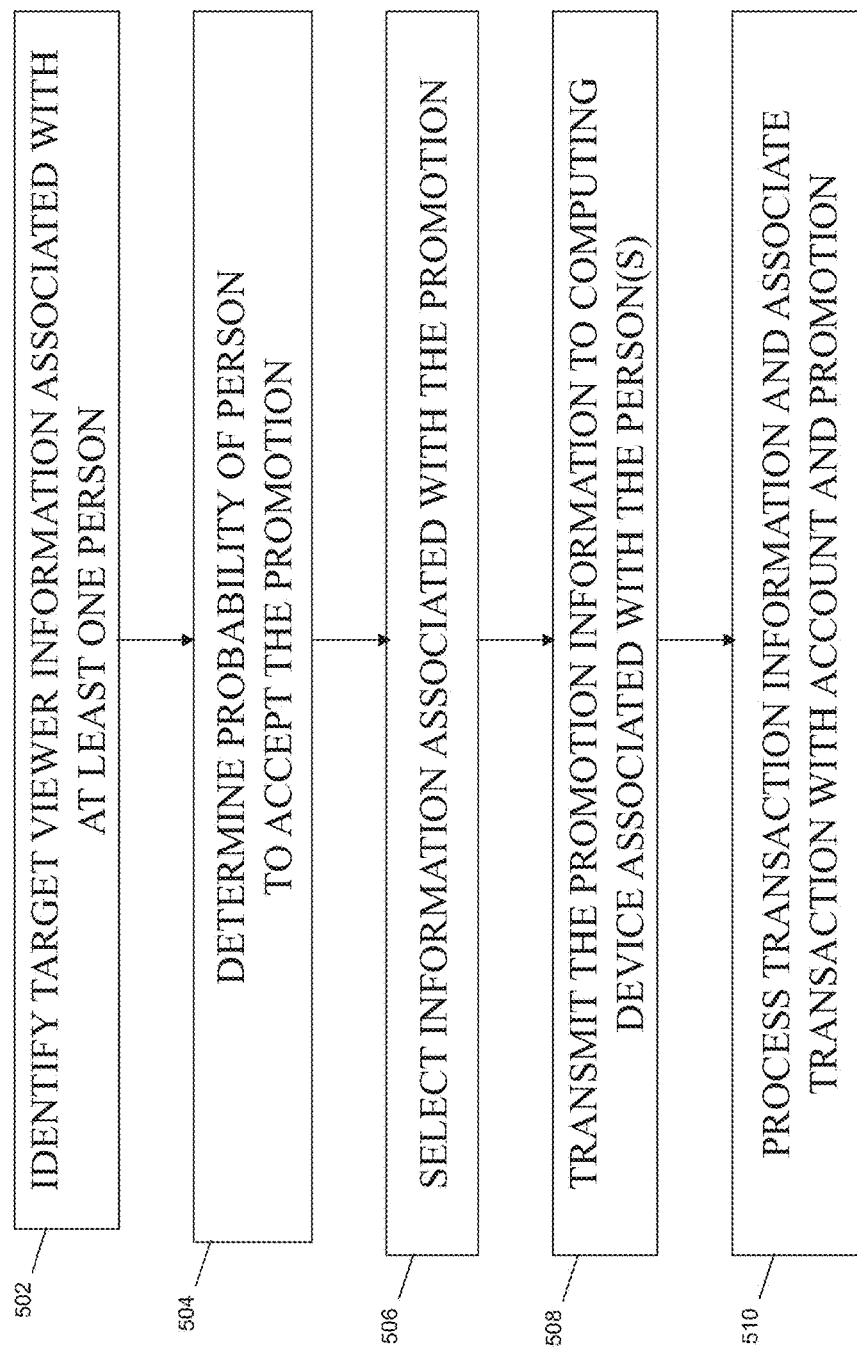

With reference now to FIG. 5, in one or more implementations, the present application provides a promotion associated with an individual purchaser's transaction account. In such implementation(s), target individual purchaser information associated with at least one individual purchaser targeted to receive an advertisement is identified (step 502). Target individual purchaser information may include, for example, a particular age group, visitors to a particular Internet web site or one or more persons accessing a particular mobile software application. In accordance with the target individual purchaser information and the advertisement, a probability of the person(s) to accept the promotion may be determined (step 504). Thereafter, and as a function of the determined probability, promotion information associated with the promotion is selected (step 506). For example, the probability may be 0% and the person may still see the advertisement. This could occur if the target viewing criteria is potentially "show the ad to every user that visits website." For example, promotional information associated with a particular brand of handbag may be selected in view of a determination that the viewer is a female under 25 years old and has a 55% probability of being receptive to a promotion associated with the handbag. The promotion information is transmitted to a computing device associated with the person(s) (step 508). In response to the transmitted promotion information, an acceptance of the promotion is received from the computing device and the promotion information is processed to associate the promotion with the transaction account (step 510). If the user has multiple transaction accounts, the user can select the desired account for loading the promotion.

In accordance with one or more implementations of the present application, the target individual purchaser information associated with at least one person includes at least one of demographics, geography and spending behavior associated with the individual purchaser. The probability of the at least one individual purchaser to accept the promotion includes applying analytics associated with of the target individual purchaser information. Moreover, the analytics may include statistical techniques to identify a propensity of the individual purchaser to accept the promotion, or that the target individual purchaser is associated with at least one of the respective demographic, the geography, and/or the spending behavior, and further identifying that the target individual purchaser fits a historical profile of one or more people that have a propensity to or actually did accept the promotion.

The target individual purchaser information in accordance with the present application may be stored in or otherwise be associated with a cookie ID or mobile device ID. As used herein, a "mobile device ID" may refer, generally, to one or more various identifiers, including e-mail address, cell phone number, device serial number or an identifier assigned by or otherwise associated with an application provider/mobile site publisher. The mobile device ID, therefore, associates a user with a device. In one or more implementations, a "cookie" may be formatted as a text file and stored on a user's computing device, which is accessible by a web browser software application. In such implementation, data on the browser are provided in the cookie text file. Alternatively, data may be linked or otherwise associated with a cookie and accessible in a database/server. In this respect, the data are "associated" with a cookie, but not necessarily provided in the cookie itself. Moreover, the target individual purchaser information may be identified after (s)he logs into a computing device over a network.

Moreover, at least one rule be defined and/or applied that is associated with the target individual purchaser information. The rule(s) may be received from a computing device associated with the promotion, and the probability of the at least one individual purchaser to accept the promotion may be determined in accordance with the rule(s). In such case, information associated with the individual purchaser may be known in advance. For example, a cookie ID or mobile device ID may be associated with geographic and/or demographic information, and spending characteristics may be assessed or referenced for a variety of individual purchasers over time. Characteristics may get associated when: (i) the cookie enters an environment where registration/login is required and the cookie is associated with the registration data; (ii) an IP address from which the cookie is accessing the internet is mapped to a physical location; and/or (iii) a cookie browses sites that contextually allow demographic information to be associated.

As noted herein and in accordance with one or more implementations, the individual purchaser's transaction account is securely and operatively coupled to a trusted service manager or a transaction card. The transaction card may be, for example, a credit card, a debit card, a rewards card, a gift card, a hotel room key and/or a membership card. In one or more implementations, the card has a name, address, or some other type of personally identifiable information associated with it that the card-linked offer company can use for matching. In one or more implementations, the card may be a gift card that has other information, such as relating to a credit card or debit card that was used to purchase the gift card, associated therewith. The transaction card may further be associated with a database that includes one or more characteristic and/or registration information that is usable to be matched to the first user.

In one or more implementations, a propensity score may be identified that is associated with an offer/promotion and information associated with the target individual purchaser. The probability of the at least one individual purchaser to accept the promotion may include an application of the propensity score.

Although many of the examples and descriptions provided herein relate to a single promotion or offer being provided to an individual purchaser, such as formatted in an advertisement, multiple promotions and/or offers may be provided to an individual purchaser. In one or more implementations, a second offer and/or promotion may be selected as a function of the determined probability of the at least one individual purchaser to accept a promotion. The second offer/promotion may be sent to the individual purchaser. In cases in which the individual purchaser is associated with a plurality of people (e.g., a plurality of individual purchasers), the second promotion may be transmitted to at least one other person of the plurality who is not the same person who received the first promotion and/or offer. The first purchaser can send the promotion to another person. Alternatively, in cases in which multiple persons are associated, the secondary purchasers may receive one or more offers on the basis of this association. For example, a person may be likely to buy what friends/family with whom they share one or more particular characteristics buy. An acceptance of the offer may be received from the computing device associated with the other person. In such case, the second promotion may be processed to associate the second promotion with a second transaction account associated with the other person.

In addition or in the alternative to sending a second promotion and/or offer to a second individual purchaser, one individual purchaser may be sent two promotions at substantially the same time. For example, an individual purchaser perusing an Internet web site directed to news content receives three banner advertisements, each providing a respective offer and/or promotion. Further, offers and/or promotions may be distributed to individual purchasers by one or more other individual purchasers who previously received the offers and/or promotions. For example, someone who forwards or otherwise sends an offer and/or promotion received in accordance with the present application may receive to three other people may receive an additional promotion and/or offer. By contributing to advertisement conversions, various individual purchasers may enjoy greater benefits associated with offers and/or promotions.

Figure 6:
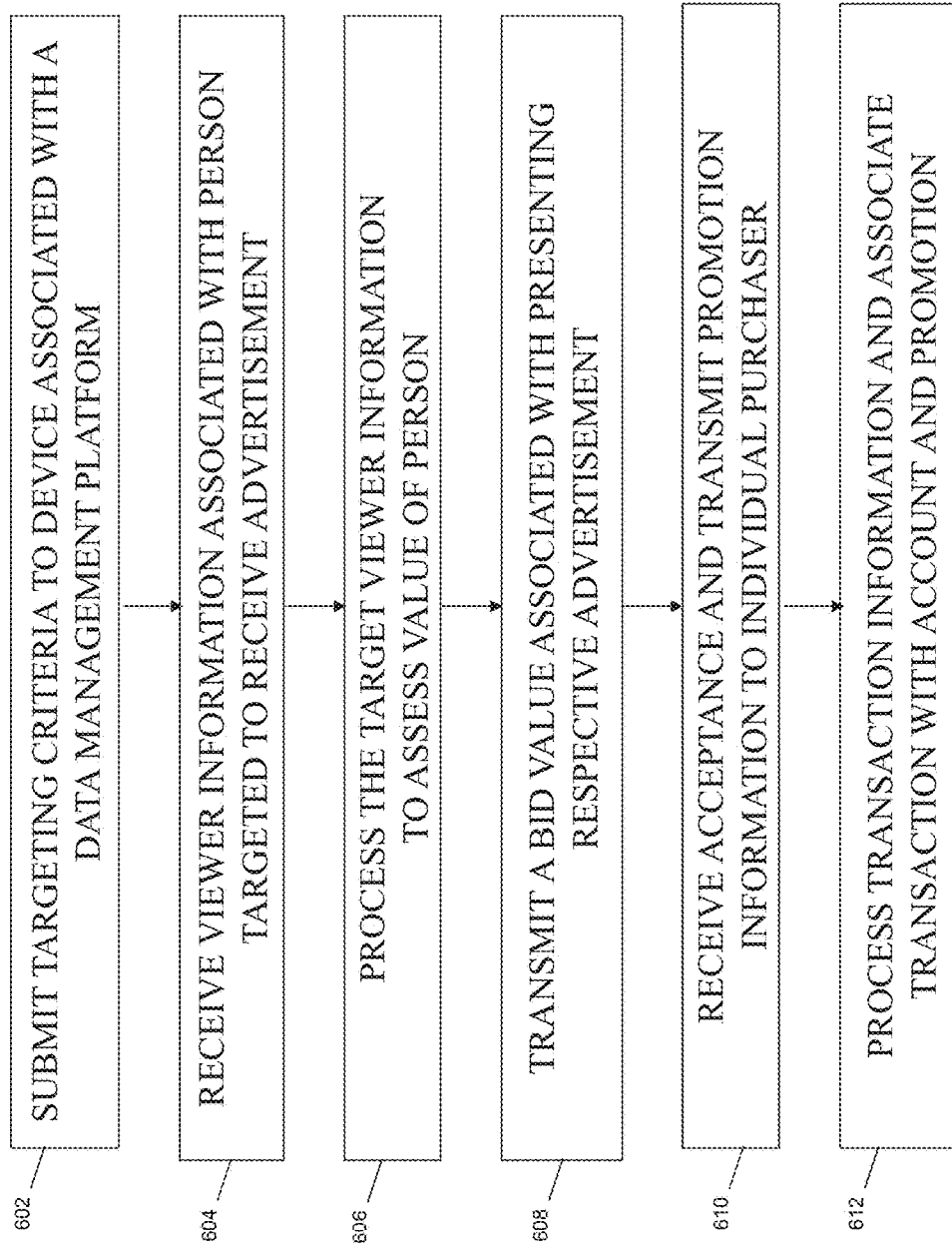

With reference now to FIG. 6, in one or more implementations the present application provides a promotion associated with a transaction account, in which advertising targeting criteria is submitted to a computing device associated with a data management platform (step 602). The advertising targeting criteria is usable to target at least one individual purchaser to receive a respective advertisement for the promotion. For example, the targeting information may represent one or more of a particular age group, gender, income level, geography, web site usage, and purchase history. Web site usage may include one or more of a plurality of characteristics. For example, a web site usage may include one or more of a history of internet web sites visited by the at least one person, a length of time the at least one person visited an internet web site, the number of times the at least one person visited an internet web site, one or more products or services offered for sale on an internet web site visited by the at least one person, a number of selections in an internet web site made by the at least person, a type of computing device used for accessing selections, a type of internet web browser, and a length of time since the at least one person visited an internet web site. This may include the number of times that an individual purchaser had previously seen an offer or promotion associated with a specific campaign.

In such implementation(s), viewer information that is associated with at least one individual purchaser targeted to receive the respective advertisement is received and processed (step 604). The target viewer information may be processed to assess a value of the at least one individual purchaser to a respective merchant or group of merchants (step 606). Furthermore, a bid value that is representative of the assessed value may be provided that is associated with presenting the respective advertisement, and transmitted to a computing device associated with an advertisement exchange (step 608). Thereafter, an acceptance of the bid may be received, and a promotion may be transmitted to a computing device associated with the at least one person (step 610). In response to the transmitted promotion, an acceptance of the promotion is received and processed to associate the promotion with the transaction account (step 612).

Moreover and in accordance with one or more implementations, processing the promotion to associate the promotion with the transaction account and include accessing one or more databases that include information associated with purchasers and transaction accounts. Some of the information included in the database(s) that correspond with the at least one individual purchaser may be selected.

Figure 7:
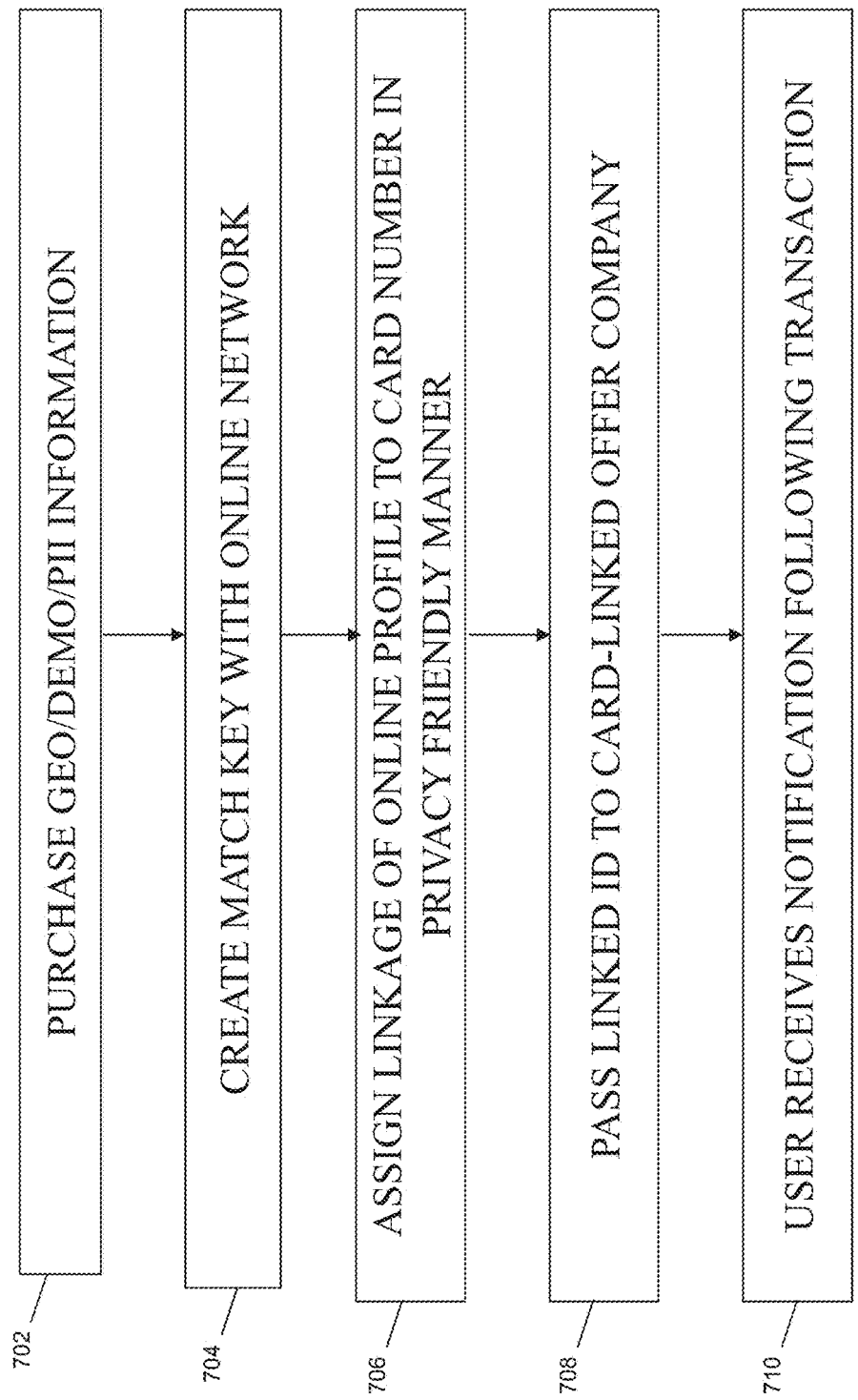
FIG. 7 is a flowchart that illustrates example steps associated with an example implementation for assigning an offer to a transaction account.
Figure 8A:
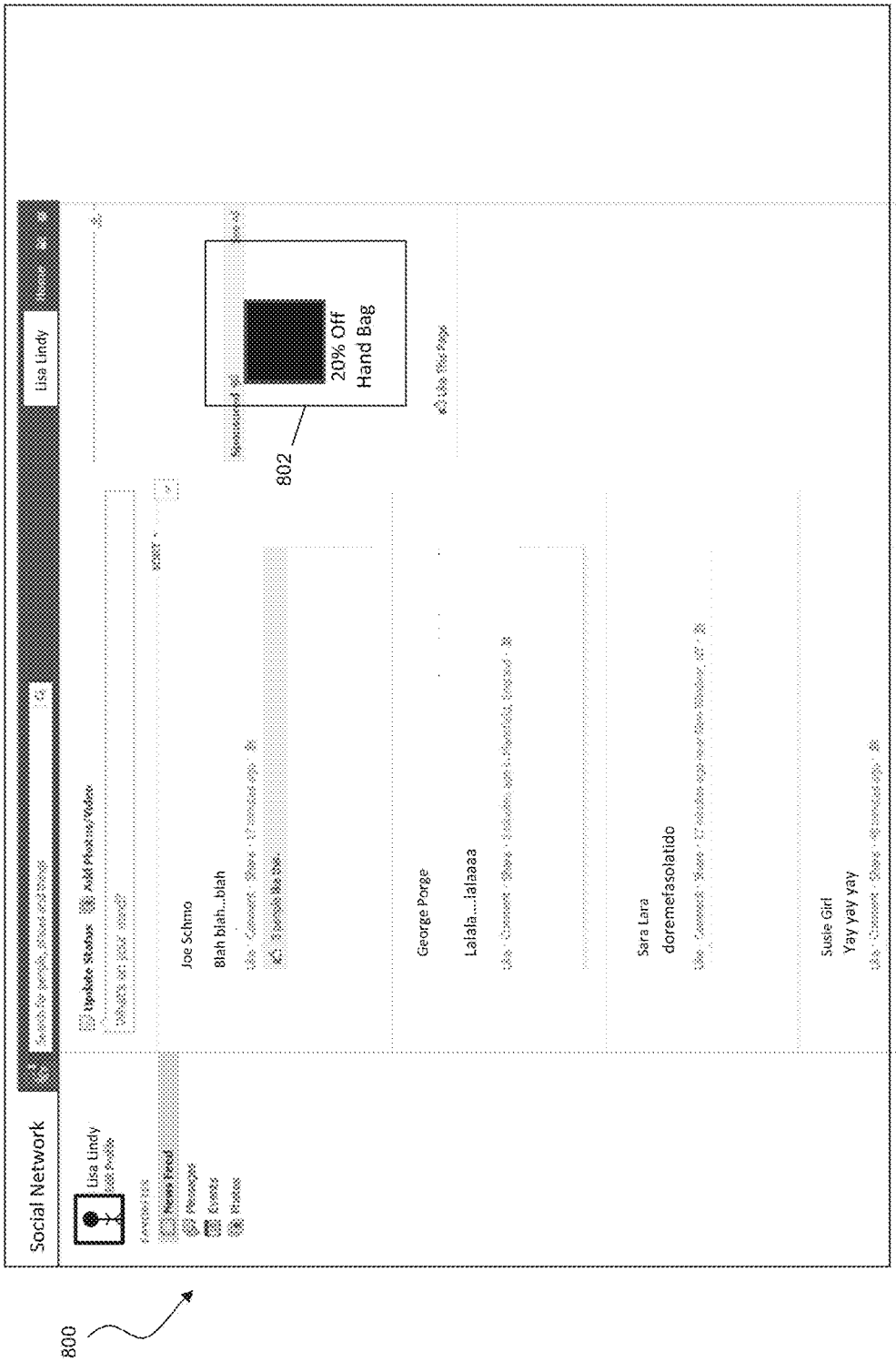
FIGS. 8A-8C illustrate example progressions of operation of a display screen that represent an example on-line network associated with a social network website.
Figure 8B:
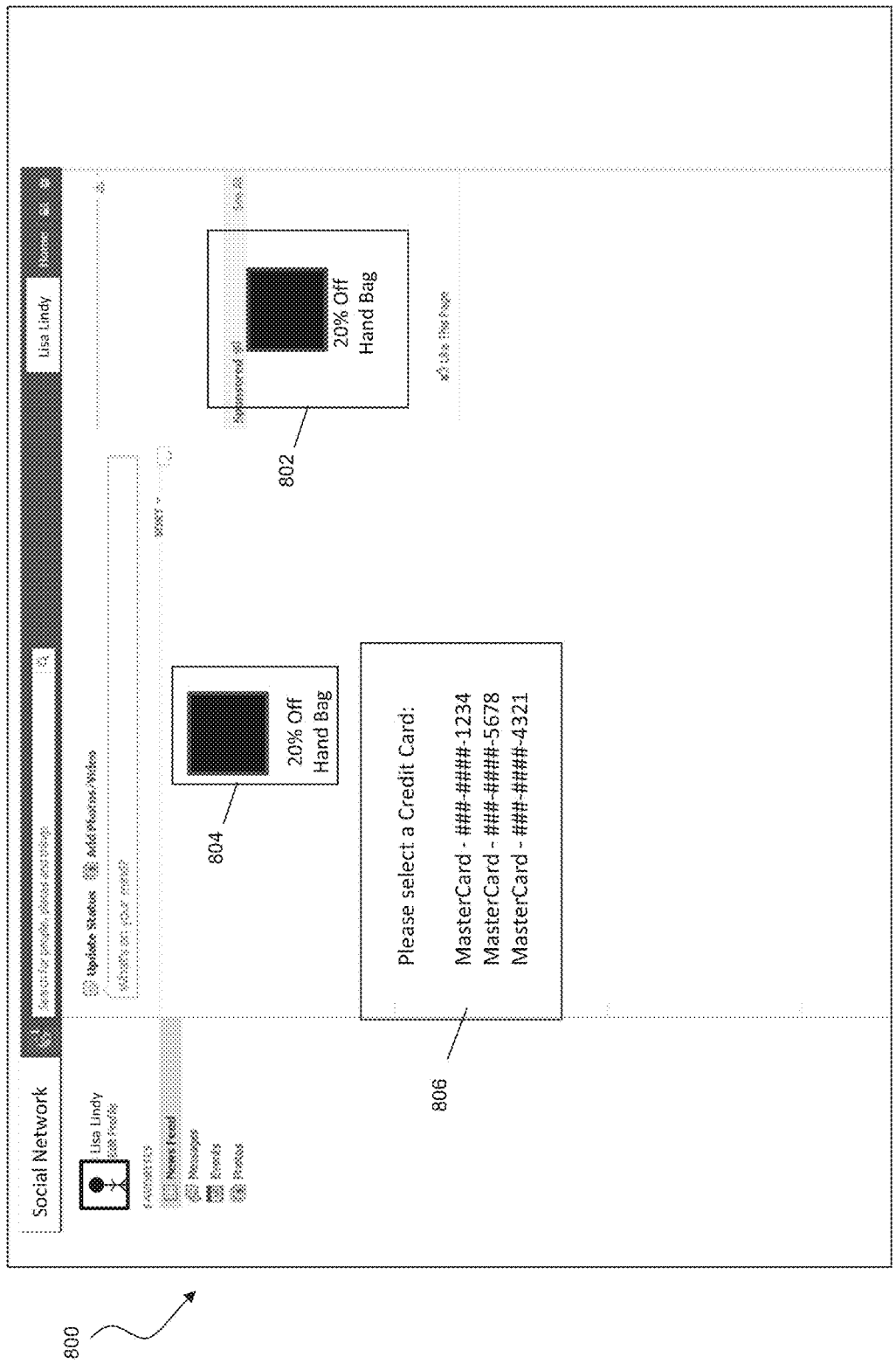
Figure 8C:
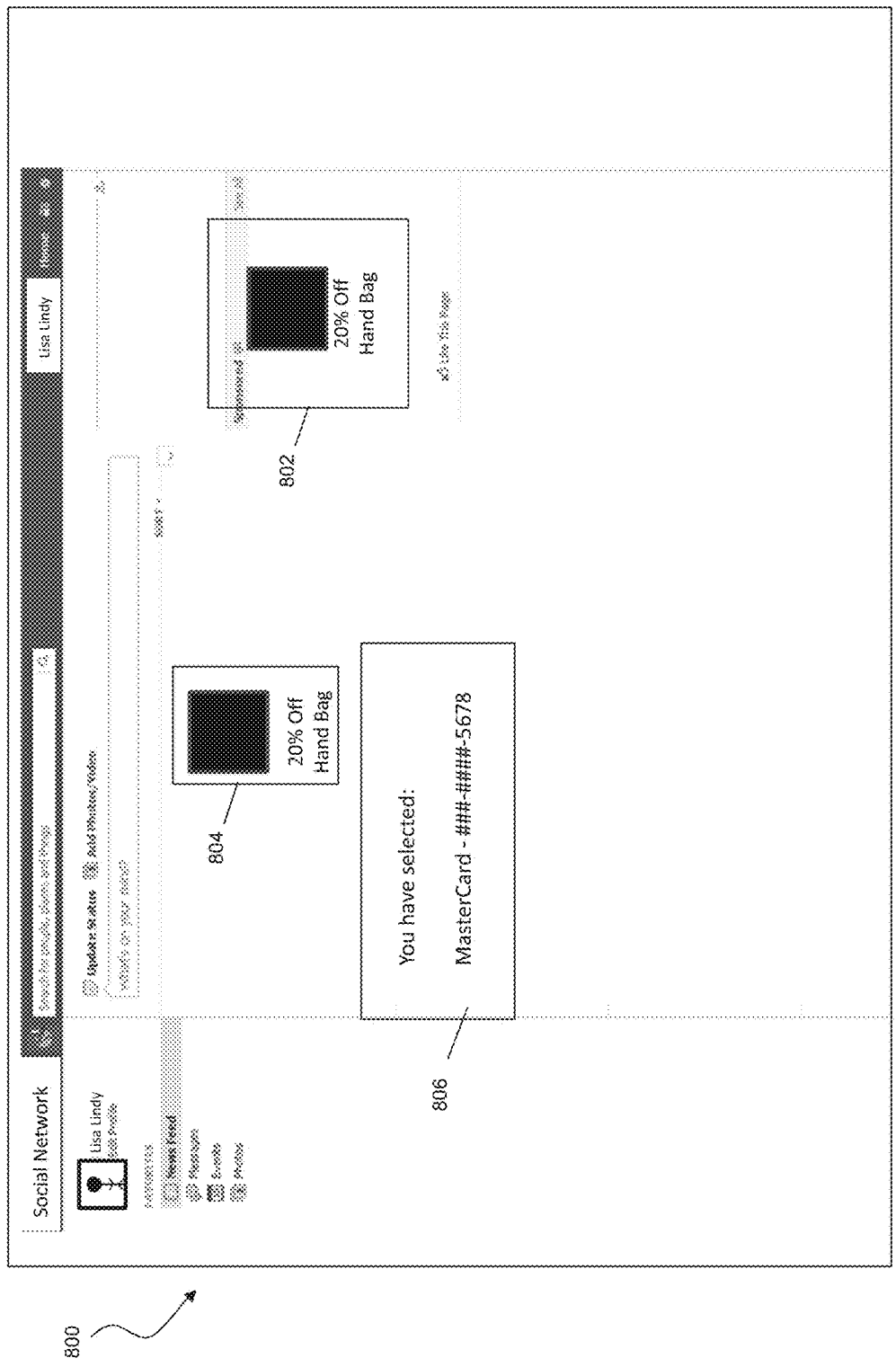

FIG. 7 is a flowchart illustrating example steps associated with an example implementation for assigning an offer to a transaction account. At step 702, information is obtained, for example purchased, from an on-line network in which users register and provide personally identifiable information. Various forms of information, such as users' geographic information, demographic information, and specific personally identifiable information may be obtained. Using the information received from the on-line network, an index value (e.g., a "match key") may be created for the records received from the on-line network (step 704). Using the match key, a linkage of online profile to a user's card number is assigned in a manner that protects the user's privacy (step 706). Thereafter, the linked ID is passed to a card-linked offer company (step 708), and the user receives a notification of the offer being applied to a transaction account following the transaction (step 710). Alternatively, if a cookie is stored and match key variables are already associated, then there may be no need to match the cookie ID to find the match data points FIGS. 8A-8C illustrate example progressions of operation of a display screen 800 that represent an example on-line network associated with a social network website. In the example shown in FIG. 8A, a user's home page (e.g., a "newsfeed") is shown that includes postings from other users of the on-line network who are affiliated with the user. As shown in the example display screen 800, promotion/offer 802 is included that offers a 20% discount on a product from a hand bag company. As shown in FIG. 8B, the user has selected the offer (indicated at 804) and a plurality of transaction account numbers are illustrated in section 806 for the user to select for application of the offer. For example, three MasterCard-branded accounts are illustrated for selection. For privacy purposes and in the example shown in FIG. 8B, the account numbers are formatted to reveal only a portion of the numbers. The implementation can be arranged so that the online network does not get access to any of the digits in the card number to further protect privacy. In such implementation, the advertising unit may be sandboxed and only communicate with the necessary parties.

In the example illustrated in FIG. 8C, the user has selected one of the transaction account numbers to be applied for the 20% discount offer. Thereafter, when the purchaser purchases the item, the 20% discount is applied directly to the account associated with the selection by the user.

Figure 9A:
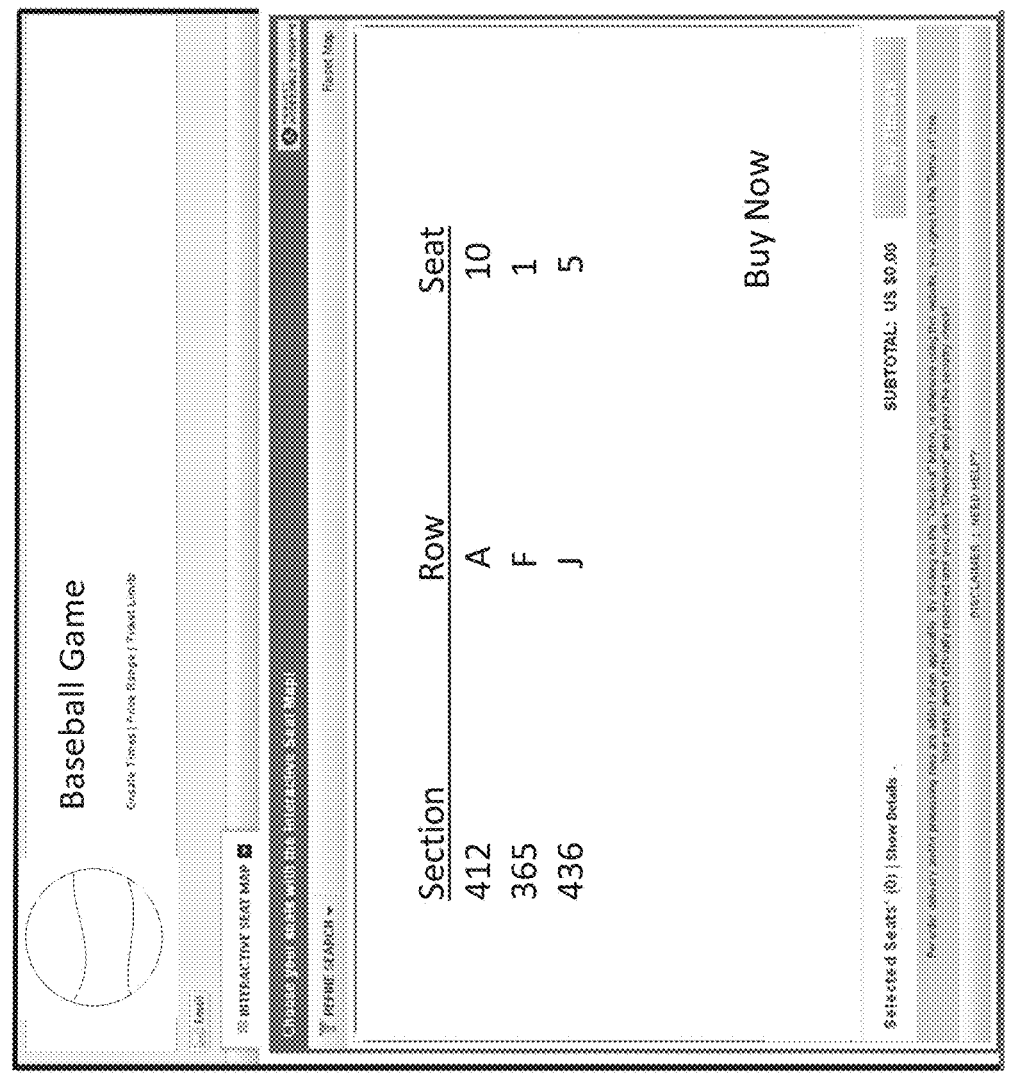
FIGS. 9A-9B illustrate example progressions of operation of a display screen that represents an example on-line network associated with a sports ticket purchase site.
Figure 9B:
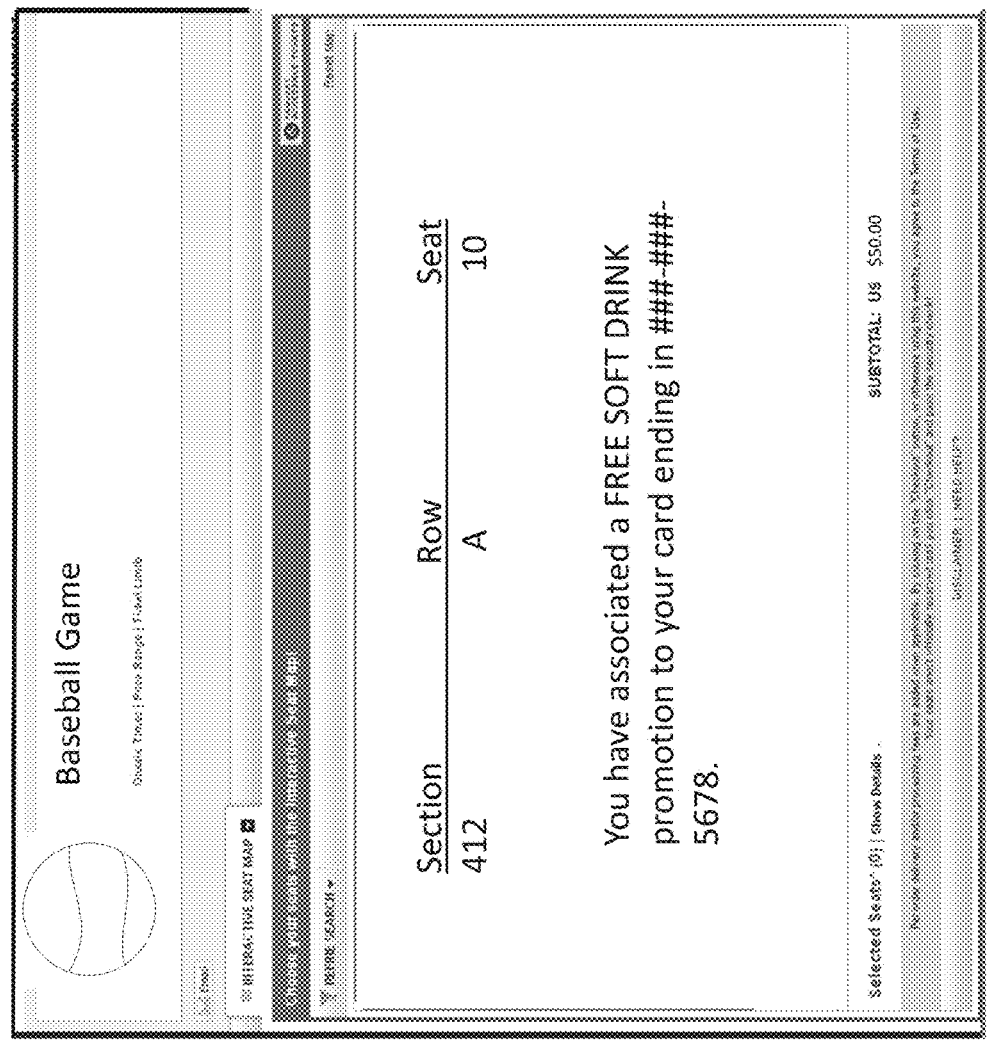

FIGS. 9A-9B illustrate example progressions of operation of a display screen 900 that represents an example on-line network associated with a sports ticket purchase site. In the example shown in FIG. 9A, a user is selecting a seat to a baseball game. Three available tickets are illustrated for the user's selection. Upon selection of a seat and the purchase of the seat for the game, the user is notified, as shown in FIG. 9B, that the user is entitled to a free soft drink. When the user attends the baseball game, the user purchases a soft drink using the same payment card used to pay for the tickets, and the offer is applied directly to the account associated with the card. Multiple transaction accounts may be provided, and the user can select the same card. In one or more alternative implementations in which offers are associated with a card that transacts via a POS, a specific item may be transacted for at a later date. In such cases, the user makes the selection and the redeemed offer is associated via the clearinghouse, not via the POS.

Thus, the example shown in FIGS. 9A-9B illustrate functionality in accordance with the present application in which a promotion may be provided in connection with ticket purchase and an item sold at the venue, such as food, drink, souvenir, or other purchasable item. The offer may be applied to the card used to purchase one or more tickets.

Figure 10A:
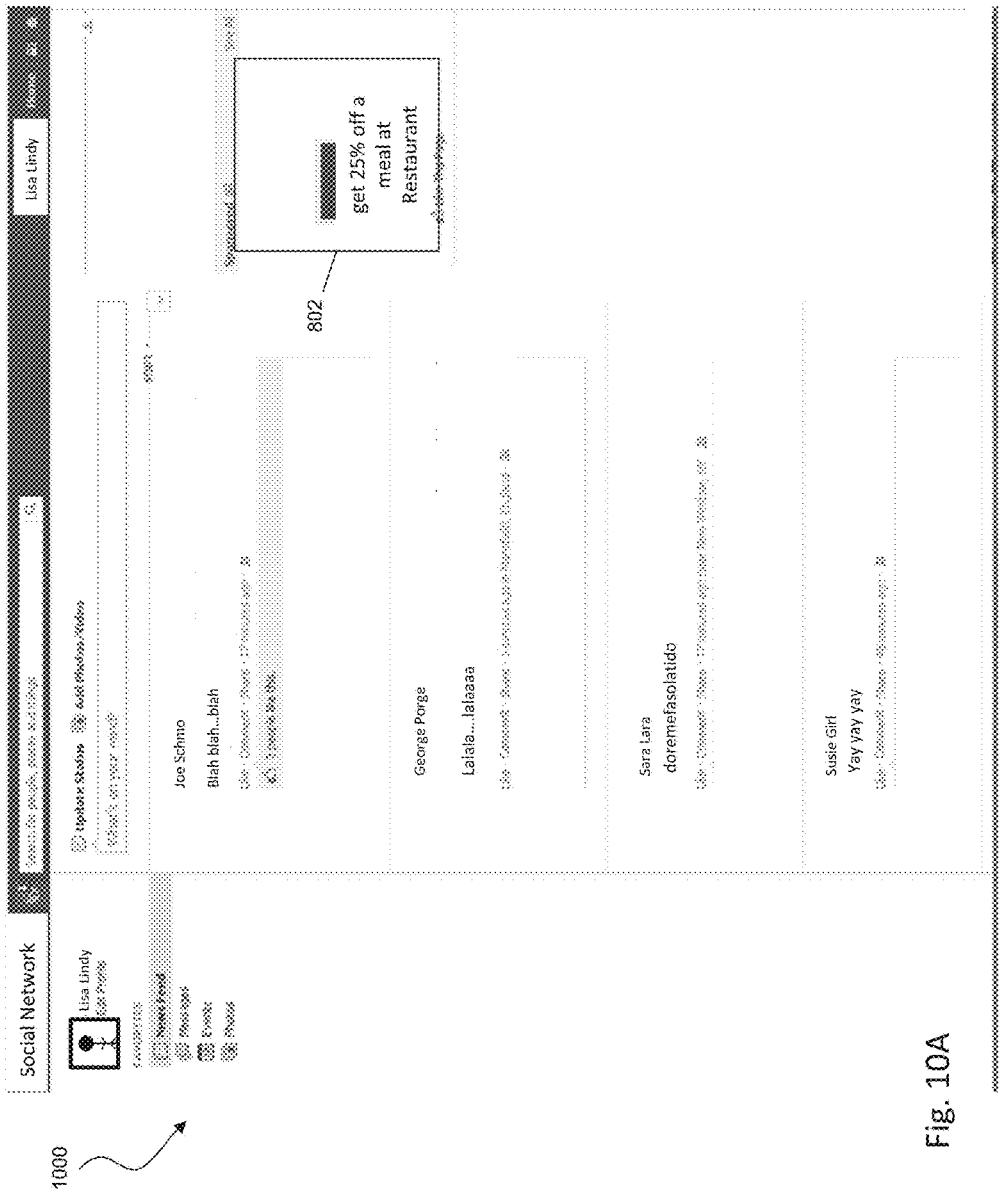
FIGS. 10A-10C illustrate alternative example progressions of operation of a display screen that represent an example on-line network associated with a social network website.
Figure 10B:
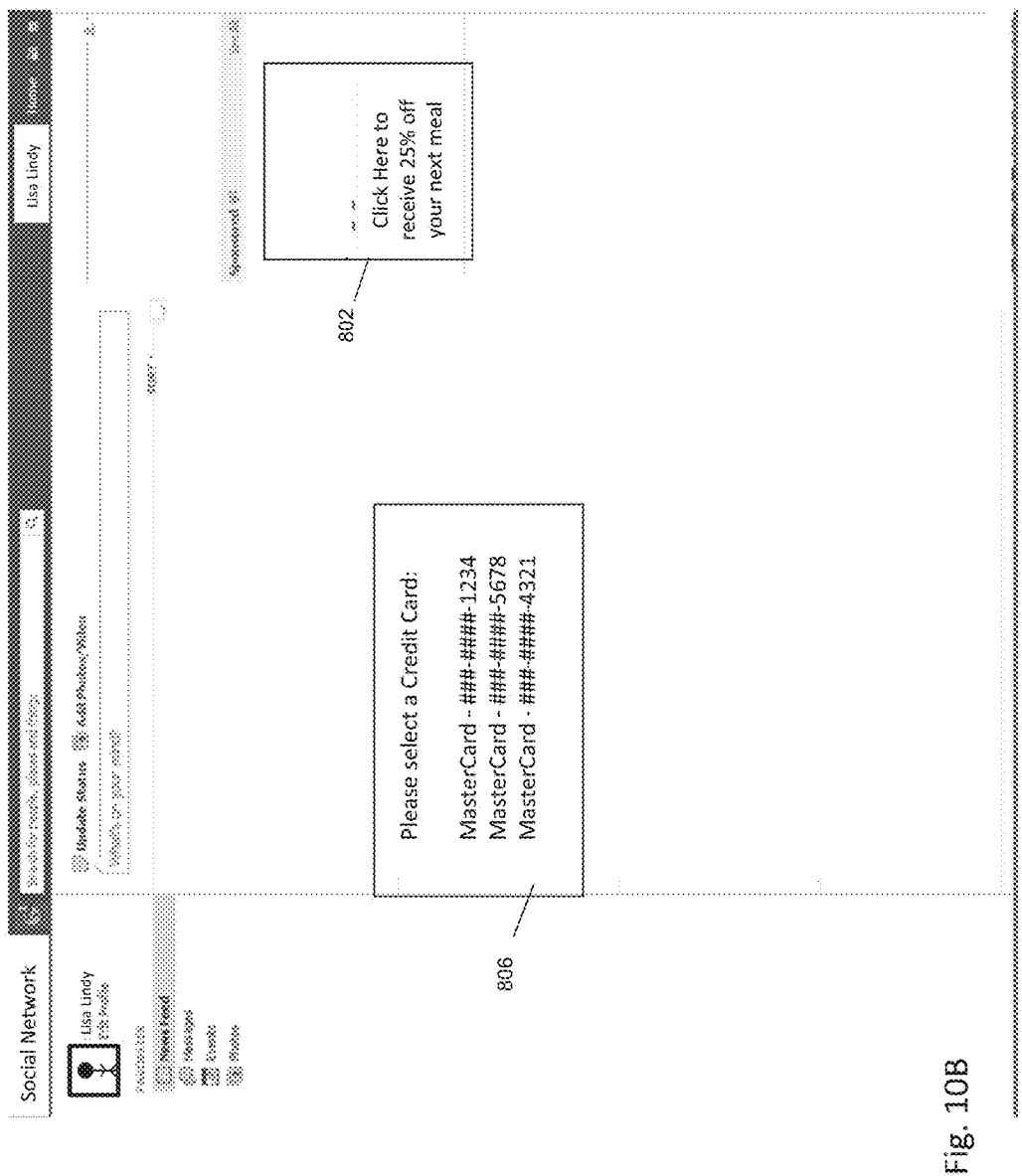
Figure 10C:
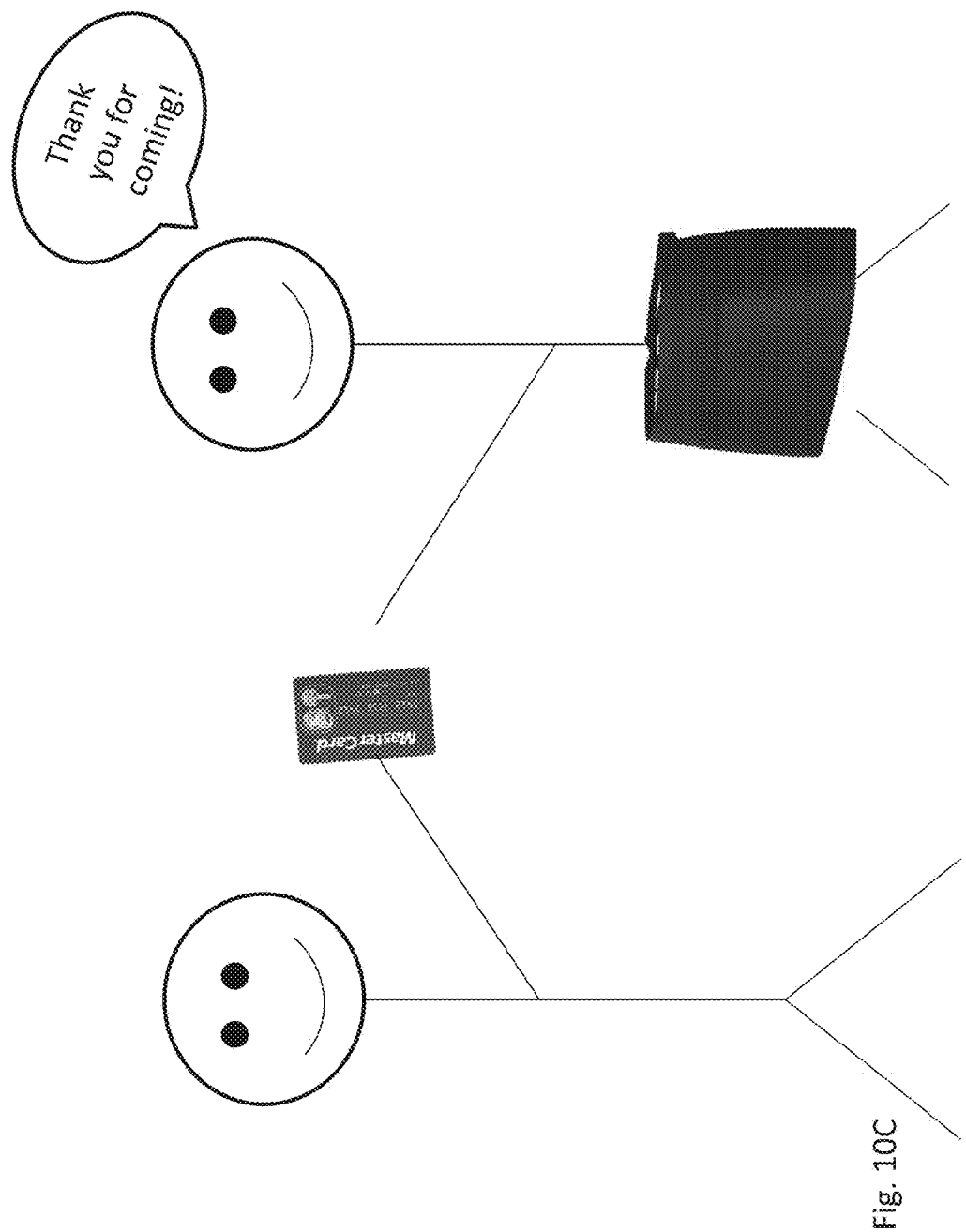

FIGS. 10A-10C illustrate example progressions of operation of a display screen 1000 that represent an example on-line network associated with a social network website. In one or more implementations, a user can associate a promotion with a transaction account and then choose to use another card and then use the promotion associated transaction account at another point in time. As shown in the example display screen 1000, promotion/offer 802 is included that offers a 25% discount on a meal from a restaurant chain. As shown in FIG. 10B, the user has selected the offer and a plurality of transaction account numbers are illustrated in section 806 for the user to select for application of the offer. For example, three MasterCard-branded accounts are illustrated for selection. For privacy purposes and in the example shown in FIG. 8B, the account numbers are formatted to reveal only a portion of the numbers.

In the example illustrated in FIG. 10C, the user has selected one of the transaction account numbers to be applied for the 25% discount offer and has enjoyed a meal at the restaurant. Thereafter, when the purchaser pays for the meal using the selected card, the 25% discount is applied directly to the account associated with the selection by the user. Alternatively, the discount can be applied as a statement credit at the end of the billing cycle.

Thus, as shown and described herein with reference to FIGS. 8-10, various forms of offers may be applied to transaction accounts and in a wide variety of contexts. For example, discounts on items purchased in an e-commerce web site, promotional items given away or sold at sporting events, and discounts to be applied to future purchases, are all supported in accordance with the present application. Moreover, the present application supports various contexts in connection with card-linked offers, including providing an architecture and process for the assignment of a promotion and/or offer to be associated with a transaction account, a promotional advertising unit associated with an individual purchaser's transaction account, and a promotion associated with a transaction account, in which advertising targeting criteria is submitted to a computing device associated with a data management platform.

Although many of the descriptions and examples set forth herein include physical cards, (e.g., credit and debit cards), the present application is not so limited. In one or more implementations, for example, one or more redeemable offers are applicable to a transaction account that is associated with a digital wallet. As used herein, the term digital wallet refers, generally, to an electronic device that stores or otherwise has access to financial (e.g., payment) information and that can be used to complete a transaction, such as a financial transaction. For example, a digital wallet may include a computer (e.g., a desktop computer, laptop computer or mobile computing device, such as a smartphone, tablet or other portable computing device), as well as a software application operating thereon and an infrastructure configured for accepting, processing and transmitting information associated with one or more transactions. Transactions involving the use of a digital wallet may occur at a traditional brick and mortar merchant, and/or may occur remotely, such as via a data communication network. Moreover, a digital wallet may be applicable in addition to or in place of, for example, a credit card, a debit card, a rewards card, a gift card, a hotel room key and/or a membership card. In one or more implementations, a digital wallet maintains a name, address, or some other type of personally identifiable information associated that can be used, for example, for matching purposes associated with transaction account-linked offers, substantially as shown and described herein.

Accordingly, although illustrated embodiments of the present disclosure have been shown and described, it should be understood that various changes, substitutions, and alterations can be made by one of ordinary skill in the art without departing from the scope of the present disclosure.

What is claimed:

1. A computer-implemented method for applying a promotion or rebate associated with a transaction account, the method comprising:
   receiving, with one or more processors from a computing device associated with a first party, offer information representing an offer for a promotion or rebate provided to a purchaser while the purchaser is operating a computing device that is connected to a publisher's Internet web site;
   in response to a selection of the promotion or offer and while the computing device operated by the purchaser is connected to the publisher's Internet web site, receiving, from a computing device associated with the publisher's Internet website, information representing the purchaser;
   generating, with the one or more processors, a match key that is associated with the purchaser and usable to access information representing a plurality of transaction accounts of the purchaser;
   transmitting, with the one or more processors, to a computing device having access to information representing the plurality of transaction accounts, the match key;
   receiving, with the one or more processors in response to the transmitted match key, the information representing the plurality of transaction accounts;
   transmitting, with the one or more processors to a computing device associated with the publisher's Internet website, the information representing the plurality of transaction accounts for generating and displaying for the computing device operated by the purchaser, without controlling the appearance of the publisher's Internet web site on other computing devices operated simultaneously by other users, a prompt for a selection of one of the plurality of transaction accounts;

receiving, with the one or more processors, from the computing device operated by the purchaser in response to the prompt, a selection of one of the plurality of transaction accounts for future application of the promotion or rebate, wherein the selection of the one transaction account represents an acceptance of the offer; and associating, with the one or more processors, at least some of the offer information with the selected one transaction account wherein the rebate or promotion is applied, without user assistance, to the selected one transaction account as a function of transaction information representing a purchase made by the purchaser using the selected one transaction account in accordance with the offer information.

2. The method of claim 1, wherein the offer information is received and maintained for access prior to receiving the transaction information, or determined substantially in real-time as a function of an offer received by the purchaser.

3. The method of claim 2, wherein the offer information is determined based on one or more of an identification of the offer, a number of offers redeemed by the purchaser, and a value of the purchaser to a merchant.

4. The method of claim 1, wherein the at least one transaction account is a securely and operatively coupled to a trusted service manager or a transaction card.

5. The method of claim 4, wherein the transaction card is a credit card.

6. The method of claim 4, wherein the transaction card is associated with a database, wherein the database includes characteristic and/or registration information that is usable to be matched to the purchaser.

7. The method of claim 1, further comprising:
transmitting, to a computing device associated with a third party, at least some of the offer information;
receiving, from a computing device associated with the third party, purchaser identification information representing at least an identification associated with the purchaser; and
associating the purchaser identification information with the plurality of transaction accounts.

8. The method of claim 7, wherein the purchaser identification information includes information representing at least one selected from a group consisting of: name; email address; zip code; address; gender; telephone number; income; education; debt; at least one family member; census tract; and demographics.

9. The method of claim 1, further comprising:
accessing one or more databases that include information associated with purchasers and transaction accounts; and
selecting at least some of the information included in the database that corresponds with at least the purchaser.

10. The method of claim 1, wherein the first party is associated with a social network.

11. The method of claim 1, wherein the first party is associated with a merchant.

12. The method of claim 1, further comprising formatting the account information to include information associated with at least the promotion or rebate and the selected one transaction account.

13. The method of claim 12, wherein the account information includes a credit card number and expiration date.

14. The method of claim 12, wherein the account information includes information associated with the purchaser.

15. A system for applying a promotion or rebate associated with a transaction account, the system comprising:
one or more processors configured to interact with a computer-readable medium in order to perform operations that include:
receiving, from a computing device associated with a first party, offer information representing an offer for a promotion or rebate provided to a purchaser while the purchaser is operating a computing device that is connected to a publisher's Internet web site;
in response to a selection of the promotion or offer and while the computing device operated by the purchaser is connected to the publisher's Internet web site, receiving, from a computing device associated with the publisher's Internet website, information representing the purchaser;
generating a match key that is associated with the purchaser and usable to access information representing a plurality of transaction accounts of the purchaser;
transmitting to a computing device having access to information representing the plurality of transaction accounts, the match key;
receiving, in response to the transmitted match key, the information representing the plurality of transaction accounts;
transmitting, to a computing device associated with the publisher's Internet website, the information representing the plurality of transaction accounts for generating and displaying for the computing device operated by the purchaser, without controlling the appearance of the publisher's Internet web site on other computing devices operated simultaneously by other users, a prompt for a selection of one of the plurality of transaction accounts;
receiving, from the computing device operated by the purchaser in response to the prompt, a selection of one of the plurality of transaction accounts for future application of the promotion or rebate, wherein the selection of the one transaction account represents an acceptance of the offer; and
associating at least some of the offer information with the selected one transaction account
wherein the rebate or promotion is applied, without user assistance, to the selected one transaction account as a function of transaction information representing a purchase made by the purchaser using the selected one transaction account in accordance with the offer information.

16. The system of claim 15, wherein the offer information is received and maintained for access prior to receiving the transaction information, or determined substantially in real-time as a function of an offer received by the purchaser.

17. The system of claim 16, wherein the offer information is determined based on one or more of an identification of the offer, a number of offers redeemed by the purchaser, and a value of the purchaser to a merchant.

18. The system of claim 15, wherein the at least one transaction account is a securely and operatively coupled to a trusted service manager or a transaction card.

19. The system of claim 18, wherein the transaction card is a credit card.

20. The system of claim 18, wherein the transaction card is associated with a database, wherein the database includes characteristic and/or registration information that is usable to be matched to the purchaser.

21. The system of claim 15, wherein the one or more processors are further configured to perform operations that include:
transmitting, to a computing device associated with a third party, at least some of the offer information;
receiving, from a computing device associated with the third party, purchaser identification information representing at least an identification associated with the purchaser; and
associating the purchaser identification information with the plurality of transaction accounts.

22. The system of claim 15, wherein the purchaser identification information includes information representing at least one selected from a group consisting of: name; email address; zip code; address; gender; telephone number; income; education; debt; at least one family member; census tract; and demographics.

23. The system of claim 15, wherein the one or more processors are further configured to perform operations that include:
accessing one or more databases that include information associated with purchasers and transaction accounts; and
selecting at least some of the information included in the database that corresponds with at least the purchaser.

24. The system of claim 15, wherein the first party is associated with a social network.

25. The system of claim 15, wherein the first party is associated with a merchant.

26. The system of claim 15, wherein the one or more processors are further configured to format the account information to include information associated with at least the promotion or rebate and the selected one transaction account.

27. The system of claim 15, wherein the account information includes a credit card number and expiration date.

28. The system of claim 15, wherein the account information includes information associated with the purchaser.

29. A non-transitory computer storage medium encoded with a computer program, the program comprising instructions that, when executed by one or more data processing apparatus, cause the one or more data processing apparatus to perform operations for applying a promotion or rebate associated with a transaction account, comprising:

receiving, with one or more processors from a computing device associated with a first party, offer information representing an offer for a promotion or rebate provided to a purchaser while the purchaser is operating a computing device that is connected to a publisher's Internet web site;

in response to a selection of the promotion or offer and while the computing device operated by the purchaser is connected to the publisher's Internet web site, receiving, from a computing device associated with the publisher's Internet website, information representing the purchaser;

generating, with the one or more processors, a match key that is associated with the purchaser and usable to access information representing a plurality of transaction accounts of the purchaser;

transmitting, with the one or more processors, to a computing device having access to information representing the plurality of transaction accounts, the match key;

receiving, with the one or more processors in response to the transmitted match key, the information representing the plurality of transaction accounts;

transmitting, with the one or more processors to a computing device associated with the publisher's Internet website, the information representing the plurality of transaction accounts for generating and displaying for the computing device operated by the purchaser, without controlling the appearance of the publisher's Internet web site on other computing devices operated simultaneously by other users, a prompt for a selection of one of the plurality of transaction accounts;

receiving, with the one or more processors, from the computing device operated by the purchaser in response to the prompt, a selection of one of the plurality of transaction accounts for future application of the promotion or rebate, wherein the selection of the one transaction account represents an acceptance of the offer; and associating, with the one or more processors, at least some of the offer information with the selected one transaction account, wherein the rebate or promotion is applied, without user assistance, to the selected one transaction account as a function of transaction information representing a purchase made by the purchaser using the selected one transaction account in accordance with the offer information.

* * * * *